United States Patent Office 3,782,933
Patented Jan. 1, 1974

3,782,933
SENSITIZED ELECTROPHOTOGRAPHIC LAYERS
Hans Ohlschlager, Cologne, and Oskar Riester, Leverkusen, Germany, and Theofiel Hubert Ghys, Kontich, Karel Eugeen Verhille, Mortsel, and Ir Johannes Vanheertum, Halle-Zandhoven, Belgium, assignors to Agfa-Gevaert Aktiengesellschaft, Leverkusen, Germany
No Drawing. Filed Apr. 26, 1972, Ser. No. 247,813
Claims priority, application Germany, Apr. 29, 1971,
P 21 21 014.0
Int. Cl. G03g 5/08, 5/06
U.S. Cl. 96—1.7                          2 Claims

ABSTRACT OF THE DISCLOSURE

Spectrally sensitized electrophotographic material the photoconductive layer thereof contains as sensitizer a dye which contains at least one 2-oxo- or 2-thio-pyrimidine ring in the molecule.

---

The invention relates to the spectral sensitization of electrophotographic materials, in particular of those materials containing zinc oxide or organic photoconductors.

It is known that photoconductive layers whose characteristic sensitivity is usually in the ultraviolet region of the spectrum can be sensitized to visible light by the addition of dyes which transmit radiant energy. Dyes proposed for this purpose belong to various classes of dyes, e.g. triphenylmethane dyes, phenolsulphonphthaleins, xanthene and acridine dyes and the polymethine dyes cyanines, merocyanines and oxonoles.

The known dyes have, however, the disadvantage of either effecting insufficient increase in sensitivity or of causing too much discoloration of the electrophotographic layer. As a rule, only colourless or almost colourless layers can be used. The disadvantage of discoloration is particularly serious in electrophotographic materials because the sensitizing dyes used cannot be removed by washing or destroyed by baths as would happen in the usual photographic processes. Bleaching the sensitizing dyes after production of the image is complicated and economically unacceptable.

It is an object of the invention to develop a spectrally sensitized electrophotographic material in which the recording layer is as far as possible colourless and the sensitivity of which is stable in storage.

It has now been found that this requirement is fulfilled by a spectrally sensitized electrophotographic material in which the photoconductive layer contains, as sensitizing dye, a dye which contains at least one 2-oxo- or 2-thio-pyrimidine ring in the molecule.

The sensitizing dyes correspond to the following general formula

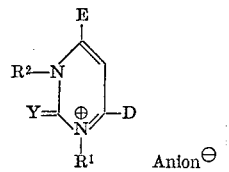

wherein D=

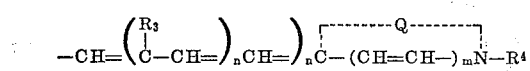

or

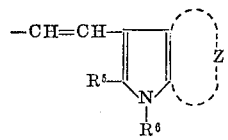

or

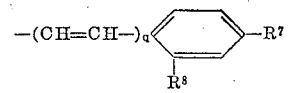

E is a hydrogen atom, a saturated or unsaturated aliphatic hydrocarbon group preferably containing up to 6 carbon atoms, for example methyl, ethyl, propyl or an aryl group, for example phenyl, or one of the groups mentioned under D, $R^1$, $R^4$, $R^6$ are (1) saturated or unsaturated aliphatic hydrocarbon groups which preferably contain up to 6 carbon atoms which may be substituted, e.g. with phenyl, hydroxyl, halogen, amino, carboxyl, sulfo, sulfonylamino, sulfamyl, carbonamido, carbamyl, carbalkoxy, sulfato or thiosulfato, (2) cycloalkyl such as cyclohexyl or (3) aryl, particularly phenyl, $R^2$ is a saturated or unsaturated aliphatic hydrocarbon group preferably containing up to 6 carbon atoms, for example methyl, ethyl, propyl or butyl, or aryl, for example phenyl, $R^3$ is a hydrogen atom, a saturated or unsaturated aliphatic hydrocarbon group preferably containing up to 3 carbon atoms, for example methyl or ethyl, or aryl, for example phenyl, $R^5$ is a phenyl group which may be substituted with alkyl such as methyl or ethyl or with aryl such as phenyl or alkoxy such as methoxy or ethoxy or with halogen such as chlorine or bromine, these substituents being preferably in the para-position, $R^7$ is a hydrogen atom or an —$OR^9$, —$NR^{10}R^{11}$ or —$SR^9$ group, $R^8$ is a hydrogen atom or a —$OR^9$ or —$SR^9$ group, $R^9$, $R^{10}$ and $R^{11}$ have the same meaning as $R^3$, Z represents the atoms for completing a condensed benzene ring which may be substituted with alkyl or alkoxy groups having up to 3 carbon atoms or with halogen, Y is an oxygen or sulfur atom, $n$ is 1 or 2, $m$ is 0 or 1 and $q$ is 1 or 2, Anion⁻ is any anion, e.g. halide such as chloride, bromide or iodide, perchlorate, sulfate, methylsulfate, p-toluenesulfonate or the like, the anion being absent in cases where $R^1$, $R^4$ or $R^6$ contains an acid group in the anionic form so that a betaine is present, Q represents a radical required to complete a heterocyclic group containing a 5-membered or 6-membered heterocyclic ring; the heterocyclic group may contain a condensed benzene or naphthalene ring and other substituents; the heterocyclic groups may be those commonly found in cyanine chemistry, for example those of the thiazole series, (e.g. thiazole, 4-methylthiazole, 5-meththiazole, 4,5 - dimethylthiazole, 4 - phenylthiazole, 5-phenylthiazole, 4,5-diphenylthiazole, etc.), those of the benzothiazole series (e.g. benzothiazole, 4-chlorobenzothiazole, 5-chlorobenzothiazole, 6-chlorobenzothiazole, 7-chlorobenzothiazole, 6 - bromobenzothiazole, 5-iodobenzothiazole, 6-iodobenzothiazole, 5-methylbenzothiazole, 5-methylbenzothiazole, 6-methylbenzothiazole, 5,6-dimethylbenzothiazole, 6-nitrobenzothiazole, 6-cyanobenzothiazole, 4-phenylbenzothiazole, 5 - phenylbenzothiazole, 6 - phenylbenzothiazole, 5-hydroxybenzothiazole, 6 - hydroxybenzothiazole, 4 - methoxybenzothiazole, 5 - methoxybenzothiazole, 6 - methoxybenzothiazole, 5 - ethoxybenzothiazole, 6-ethoxybenzothiazole, 5,6-dimethoxybenzothiazole, 5,6-methylene-dihydroxybenzothiazole, 5 - diethylaminobenzothiazole, 6-diethylaminobenzothiazole, 5-carboxybenzothiazole, 5-sulfobenzothiazole, tetrahydrobenzothiazole, 7-oxotetrahydrobenzothiazole, etc.), those of the naphthothiazole series (e.g. naphtho[1,2-d]-thiazole, naphtho[2,1-d]thiazole, 7 - methoxynaphtho[2,1 - d]thiazole, 8 - methoxynaphtho[1,2 - d]thiazole, etc.), those of the selenazole series (e.g. 4-methylselenazole or 4-phenylselenazole), those of the benzoselenazole series (e.g. benzoselenazole, 5-chlorobenzoselenazole, 5,6-dimethylbenzoselenazole, 5 - hydroxybenzoselenazole, 5 - methoxybenzoselenazole, tetrahydrobenzoselenazole, etc.), those of the naphthoselenazole series (e.g. naphtho[1,2-d]selenazole or naphtho[2,4-d]selenazole), those of the oxazole series (e.g. oxazole, 4-methyloxazole, 4-phenoxyazole, 4,5-diphenyloxazole, etc., those of the benzoxazole series (e.g. benzoxazole, 5-chlorobenzoxazole, 6-chlorobenzoxazole, 5,6-dimethylbenzoxazole, 5-phenylbenzoxazole, 5-hydroxybenzoxazole, 5-methoxybenzoxazole, 5-phenylbenzoxazole, 5-hydroxybenzoxazole, 5-methoxybenzoxazole, 5-ethoxybenzoxazole, 6-dialkylbenzoxazole, 5-carboxybenzoxazole, 5 - sulfobenzoxazole, sulfoamidobenzoxazole, 5-carboxyvinylbenzoxazole, etc.), those of the naphthoxazole series (e.g. naphtha[1,2-d]oxazole, naphtho[2,1-d]oxazole or naphtho[2,3-d]oxazole), those of the imidazole series (e.g. 1-methylimidazole, 1-ethyl-4-phenylimidazole, 1 - butyl-4,5-dimethyl-imidazole, 1-butyl-4,5-dimethyl-imidazole, etc.

those of the benzimidazoles series (e.g. 1-methylbenzimidazole, 1-butyl-4-methylbenzimidazole, 1-ethyl-5,6-dichlorobenzimidazole, 1 - ethyl-5-trifluoromethylbenzimidazole, etc.), those of the naphthimidazole series (e.g. 1-methylnaphtho[1,2-d]imidazole or 1 - ethylnaphtho[2,3-d]imidazole, those of the 3,3-dialkyl-indolenine series (e.g. 3,3-dimethylindolenine, 3,3,5 - trimethylindolenine, 3,3 - dimethyl-5-methoxyindolenine, etc.), those of the 2-pyridine series (e.g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine 5-hydroxypyridine, 3-phenylpyridine, 4-phenylpyridine, 6-phenylpyridine, etc.), those of the 4-pyridine series (e.g. 2-methylpyridine, 3-methylpyridine, 2,3-dimethylpyridine, 2,5-dimethylpyridine, 2,6-dimethylpyridine, 2-chloropyridine, 3-chloropyridine, 2-hydroxypyridine, 3-hydroxypyridine, etc.), those of the 2-quinoline, 7-methylquinoline, 8-methylquinoline, 6-chloroquinoline, 8-chloroquinoline, 6-methoxyquinoline, 6-ethoxyquinoline, 6-hydroxyquinoline, 8 - hydroxyquinoline, 5-oxo-5,6,7,8-tetrahydroquinoline, etc.), those of the 4-quinoline series (e.g. quinoline, 6-methoxyquinoline, 7-methylquinoline, 8-methylquinoline, etc.), those of the isoquinoline series (e.g. isoquinoline or 3,4-dihydroxyisoquinoline), those of the thiazoline series (e.g. thiazoline, 4-methylthiazoline, etc.), and those of the pyrroline, tetrahydropyridine, thiadiazole, oxadiazole, pyrimidine, triazine, benzothiazine, pyrimidone or thiopyrimidone series.

The aryl groups and heterocyclic groups may in addition carry any other substituents, e.g. other alkyl groups preferably containing up to three carbon atoms such as methyl or ethyl, halogen such as chlorine or bromine, hydroxyl, alkoxy, preferably containing up to three carbon atoms such as methoxy or ethoxy, hydroxyalkyl, alkylthio, aryl such as phenyl or aralkyl such as benzyl, amino, substituted amino, cyano, nitro and the like.

Below are given examples of suitable compounds. The absorption maxima were determined in methanolic solution unless otherwise indicated. In the table below, DMP stands for dimethylformamide and DMSO for dimethylsulphoxide.

| Number | Dye | Absorption maximum (nm.) |
|---|---|---|
| 1 | [structure with two pyridinium rings linked by -CH=CH-CH=, with CH₃ groups, S, N-CH₃, ClO₄⁻] | 568 |
| 2 | [structure with two pyridinium rings linked by -CH=CH-CH=, with CH₃ groups, O, N-CH₃, ClO₄⁻] | ¹548 |
| 3 | [structure with pyridinium ring linked to benzothiazole via -CH=C(CH₃)-CH=C, with CH₃, S, N-C₂H₅, ClO₄⁻] | ²574 |
| 4 | [structure with two pyridinium rings linked by -CH=C(CH₃)-CH=, with CH₃ groups, S, N-CH₃, ClO₄⁻] | 587 |

See footnotes at end of table.

TABLE—Continued

| Number | Dye | Absorption maximum (nm.) |
|---|---|---|
| 5 | [structure with dimethylthiopyrimidinium and benzothiazole, ClO₄⁻] | 558 |
| 6 | [structure with dimethyloxopyrimidinium and benzothiazole, ClO₄⁻] | 548 |
| 7 | [bis-dimethylthiopyrimidinium structure, Cl⁻] | 556 |
| 8 | [structure with oxopyrimidinium and phenyl-thiadiazoline, ClO₄⁻] | 535 |
| 9 | [bis-dimethyloxopyrimidinium structure, Cl⁻] | 547 |
| 10 | [bis-dimethyloxopyrimidinium structure with CH₃ on central carbon, Cl⁻] | ¹578 |
| 11 | [bis-phenylpyrimidinium structure, ClO₄⁻] | ²575 |
| 12 | [structure with oxopyrimidinium and phenyl-benzoxazole, ClO₄⁻] | 520 |

See footnotes at end of table.

TABLE—Continued

| Number | Dye | Absorption maximum (nm.) |
|---|---|---|
| 13 | (structure) | ⁴ 511 |
| 14 | (structure) | 497 |
| 15 | (structure) | 508 |
| 16 | (structure) | 544 |
| 17 | (structure) | 555 |
| 18 | (structure) | ¹ 564 |
| 19 | (structure) | 521 |

See footnotes at end of table.

TABLE—Continued

| Number | Dye | Absorption maximum (nm.) |
|---|---|---|
| 20 | (structure) | [1] 585 |
| 21 | (structure) | 565 |
| 22 | (structure) | 548 |
| 23 | (structure) | [5] 547 |
| 24 | (structure) | [5] 577 |
| 25 | (structure) | 550 |
| 26 | (structure) | 623 |

See footnotes at end of table.

TABLE—Continued
| Number | Dye | Absorption maximum (nm.) |
|---|---|---|
| 27 | 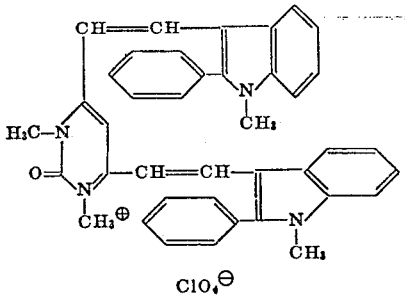 | [1] 589 |
| 28 | 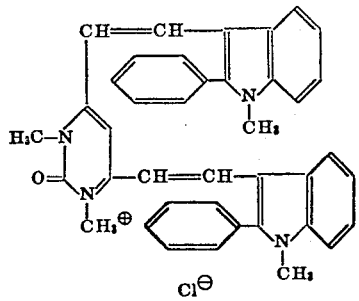 | 575 |
| 29 | 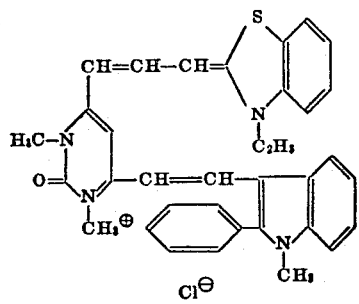 | 625 |
| 30 | 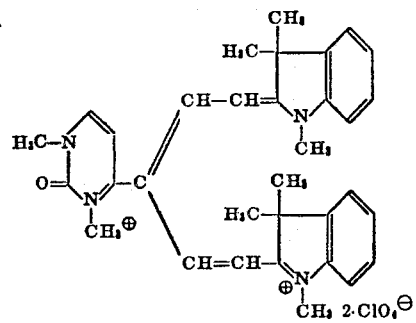 | [1] 640 |
| 31 | 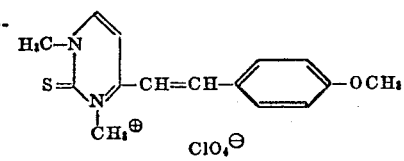 | 446 |
| 32 | 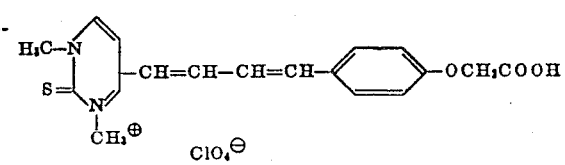 | 468 |
See footnotes at end of table.

TABLE—Continued
| Number | Dye | Absorption maximum (nm.) |
|---|---|---|
| 33 | 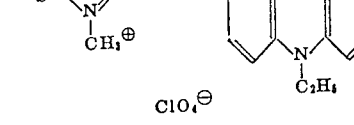 | 516 |
| 34 | 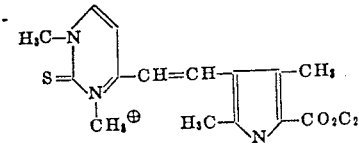 | 463 |
| 35 | 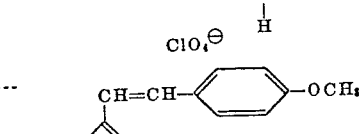 | 546 |
| 36 | 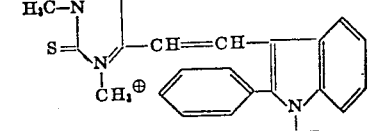 | 462 |
| 37 | 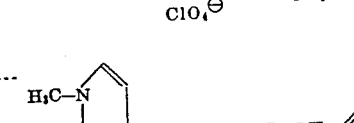 | 559 |
| 38 | 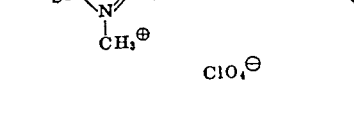 | [5] 588 |
| 39 | 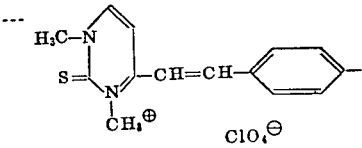 | 506 |
| 40 | 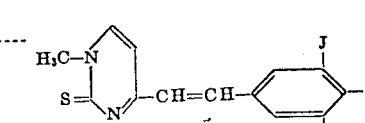 | 482 |
See footnotes at end of table.

TABLE—Continued

| Number | Dye | Absorption maximum (nm.) |
|---|---|---|
| 41 | [structure] | 516 |
| 42 | [structure] | 593 |
| 43 | [structure] | 637 |
| 44 | [structure] | ⁵ 567 |
| 45 | [structure] | ¹ 572 |
| 46 | [structure] | ⁵ 615 |
| 47 | [structure] | 497 |
| 48 | [structure] | 504 |

¹ DMF. ² Pyridine. ³ CHCl₃. ⁴ Eisessig. ⁵ DMSO.

The preparation of symmetrical and asymmetrical 2-oxopyrimidine dyes starting from 1,3-disubstituted 6-methyl-2-oxo-pyrimidinium salts or the corresponding methylene bases has been described by Baumann et al. in Ann. 717, 124–136 (1968). Symmetrical and asymmetrical 2-thiopyrimidine dyes may be prepared in analogous manner from - 1,3 - disubstitute-6-methyl-2-thio-pyrimidinium salts. Dyes which carry an alkyl group in the 4-position (e.g. E=methyl or ethyl) can be easily condensed to give tricyclic dyes (in which E denotes one of the radicals mentioned under D) by means of aldehydes such as 1-methyl-2-phenyl-3-formylindole or by means of 2-ethylthio- or 2-aceto-anilidovinyl quaternary salts of heterocyclic bases.

The preparation of several dyes is described in detail below.

Dye 7: 4.0 g. of 1,3,6-trimethyl-2-thio-pyrimidinium chloride and 5 ml. of ethyl orthoformate are heated under reflux in 10 ml. of pyridine for 5 minutes. The mixture is cooled and the dye is suction filtered and recrystallized from methanol. Yield 1.8 g.; M.P. 183° C.

Dye 26: 1.9 g. of 1,3,4,6-tetramethyl-2-oxo-pyrimidinium chloride and 2.3 g. of 1-methyl-2-phenyl-3-formyl-indole in 15 ml. of acetic acid anhydride are heated on a steam bath for 10 minutes. The dye which precipitates on cooling is heated, without further purification, with an equal quantity of 1,3,3-trimethyl - 2 - formyl-methylene-indoline in 20 ml. of acetic acid anhydride on a steam bath for 30 minutes. The mixture is cooled and the dye is precipitated with water, suction filtered, washed with water and recrystallised twice from isopropanol. 1.5 g. of the dye is obtained: M.P. 190 to 192° C. (decomposition).

Dye 27: 2.7 g. (0.01 mol) of 1,3,4,6-tetramethyl-2-thiopyrimidinium perchlorate and 5.0 g. (0.021 mol) of 1-methyl-2-phenyl-3-formyl-indole in 30 ml. of acetic acid anhydride are heated to reflux in an oil bath for 15 minutes. The dye crystallises on cooling and is suction filtered and recrystallised from dimethylsulfoxide. Yield 5.8 g.; M.P. 218–220° C.

The dyes according to the invention are particularly suitable for the spectral sensitization of inorganic photoconductors dispersed in binders, especially of zinc oxide, and of organic photoconductors. The binders used in this process may in principle be any film-forming agents, commonly used in electrophotography, for example silicone resins, alkyl resins, polyurethanes or polyvinyl acetate.

The dyes are generally added in the form of solutions to the dispersions of inorganic substances or solutions of organic photoconductive substances which are to be sensitized. The methods used for this are generally known in the art.

The sensitizing dyes may be incorporated in the usual manner in the coating liquid used for producing the photoconductive layer. The optimum quantity of sensitizing dye can be found by simple tests. It is generally between 0.01 and 20 mg. of dye per gram of photoconductor.

When preparing the electrophotographic recording materials according to the invention one may use not only the usual well known inorganic photoconductors such as in particular zinc oxide but also the known organic photoconductors.

Furthermore, the usual binders may be used for producing the photoconductive layers or, if suitable organic photoconductors are used, recording layers free from binders may be produced in known manner.

The proportion of photoconductor to binder may vary within the limits. It depends partly on the purpose for which the recording material is to be used and partly on the nature of the photoconductor. In the case of zinc oxide, for example, satisfactory results are obtained with a proportion of 1 part by weight of photoconductor to 0.1–2.0 parts by weight of binder.

The photoconductive layers may also contain other spectral sensitizers (see e.g. United Kingdom Patent No. 1,020,504) and substances for adjusting the viscosity or age resistors or pigments (see United Kingdom Pat. No. 1,007,349) or substances of the kind described in Belgian Pat. No. 612,102 in addition to the dyes according to the invention, the photoconductive substances and binders.

The photoconductive materials according to the invention may be used for the usual electrophotographic processes, for example development processes in which a solid pulverulent toner powder is used, aerosol development processes, electrophoretic processes, so-called wetting development processes and the like. The materials according to the invention are suitable both for processes using electrostatic images and processes using conductivity images.

EXAMPLE 1

100 mg. of dye in the form of a 0.1% solution in dimethylformamide are added to a mixture of 20 g. of photoconductive zinc oxide,
20 ml. of toluene,
11 ml. of ethyl acetate,
0.66 ml. of a 10% solution of tetrachlorophthalic acid anhydride in alcohol and
4.5 g. of a 50% solution of a copolymer of vinyl acetate, acrylic acid ester and acrylic acid (percent by weight 87:12:1) in a mixture of toluene, 1,2-dichloroethane and ethyl acetate (volume percent 1:1:4).

The mixture is applied to a baryta paper support (25 g. of zinc oxide per m.$^2$) and dried. The electrophotographic material obtained in this way is charged and then exposed for 15 seconds to a 450 watt incandescent lamp at an intensity of 2280 lux through a step wedge (density difference 0.1) and developed by one of the usual development processes using a toner powder. The sensitivity of the layers is obtained from the number of steps at which no particles of toner powder are deposited and at which therefore the original density of the material is preserved. The larger the number of steps, the higher is the sensitivity.

The known sensitizer Rhodamin B (Colour Index 45 170) is used as comparison dye.

TABLE 1

| Dye | Sensitization maximum (nm.) | Steps |
| --- | --- | --- |
| None | --- | 9 |
| Rhodamin B | 555 | 22 |
| 1 | 575 | 27 |
| 2 | 555 | 27 |
| 3 | 580 | 24 |
| 5 | 565 | 28 |
| 7 | 570 | 25 |
| 8 | 540 | 29 |
| 11 | 575 | 25 |
| 12 | 530 | 29 |
| 13 | 520 | 25 |
| 15 | 520 | 22 |
| 16 | 555 | 22 |
| 17 | 565 | 27 |
| 18 | 570 | 28 |
| 20 | 590 | 27 |
| 21 | 575 | 28 |
| 23 | 555 | 25 |
| 25 | 555 | 27 |
| 26 | 630 | 25 |
| 30 | 650 | 28 |
| 33 | 520 | 23 |
| 38 | 590 | 25 |
| 41 | 530 | 22 |
| 42 | 605 | 22 |
| 43 | 650 | 32 |
| 44 | 570 | 25 |
| 45 | 590 | 32 |
| 46 | 630 | 28 |

EXAMPLE 2

A solution of 0.05 g. of dye and 4 g. of 1-ethyl-3-phenyl-7-diethylamino-2-(1H)-quinoline in a mixture of 50 ml. of methylene chloride and 50 ml. of acetone is applied to an aluminium coated paper in such a thickness that the dry layer contains 2 g. of photoconductor per m.².

Each sample is charged negatively with a corona discharge using a potential difference of 6000 volt and then exposed for 15 seconds to an incandescent lamp at an intensity of 2000 lux and a distance of 25 cm. through a step wedge (density difference 0.2).

The latent image is developed electrophoretically with a developer prepared by diluting the following concentrated developer solution in the proportion of 15/1000 with Shellsol T (trade name for a hydrocarbon mixture):

Carbon black (average diameter 20 nm.) _____g__ 30
Zinc monotridecylphosphate _____g__ 1.5
Shellsol T (trade name) _____ml__ 750
Solution of binder _____g__ 150

The solution of binder is prepared by heating 500 g. of Alkydal L 67 (trade name of Farbenfabriken Bayer AG. for an alkyd resin solution) in 500 ml. of ligroin to 60° C. until a clear solution is obtained and then cooling the solution.

Relative sensitivity values are obtained by comparing the number of visible steps of the sensitized material with the number of visible steps of the unsensitized material, the relative sensitivity of the unsensitized material being taken to be equal to 100.

TABLE 2

| Dye No.: | Relative sensitivity |
|---|---|
| None | 100 |
| Rhodamin B | 1700 |
| 1 | 1800 |
| 2 | 1700 |
| 6 | 1700 |
| 13 | 4000 |
| 14 | 4000 |
| 19 | 4000 |
| 20 | 6000 |
| 27 | 2500 |
| 28 | 2500 |
| 34 | 4000 |
| 39 | 6000 |
| 47 | 1800 |

EXAMPLE 3

Mixtures are prepared from in each cases 6 g. of photoconductor, 4 g. of a copolymer of vinyl chloride/vinyl acetate/maleic acid anhydride (molar ratio 86.5/13.3/0.2), 0.05 g. of sensitizing dye, 90 ml. of 1,2-dichloroethane and 10 ml. of methylene chloride. The compound of the following formula is used as photoconductor:

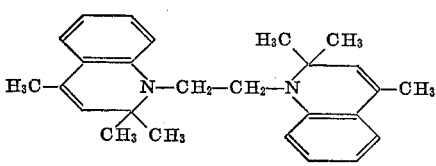

The mixtures are applied to an aluminum backed paper in such a thickness that the layers contain 3 g. of photoconductor per m.². The dry layers are negatively charged with a negative corona discharge and a potential difference of 6000 volts, exposed for 5 seconds to a 100 watt incandescent lamp at a distance of 30 cm. through a step wedge (density difference 0.2) and then developed as described in Example 2. The results obtained are summarized in the following table.

TABLE 3

| Dye No.: | Relative sensitivity |
|---|---|
| None | 100 |
| 27 | 2500 |
| 28 | 2500 |
| 33 | 2500 |
| 34 | 1500 |
| 39 | 2500 |
| 40 | 4000 |
| 41 | 1500 |
| 47 | 2500 |

We claim:

1. An electrophotographic recording material having a layer support and at least one photoconductive layer with a photoconductor selected from the group consisting of zinc oxide, 1 - ethyl - 3-phenyl-7-diethylamino-2-(1H)-quinoline and

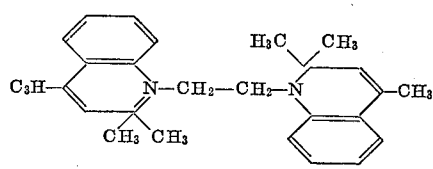

and a sensitizing dye characterised in that it contains, as sensitizing dye, a compound of the following formula:

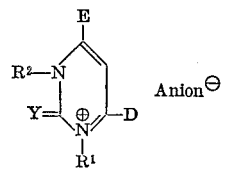

wherein D=

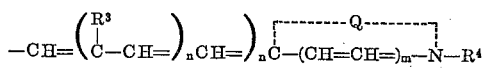

or

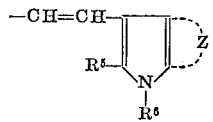

or

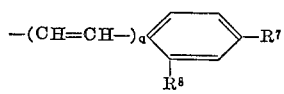

E is a hydrogen atom, a saturated or unsaturated aliphatic hydrocarbon group containing up to 6 carbon atoms or one of the groups mentioned under D;

$R^1$, $R^4$ and $R^6$ are saturated or unsaturated aliphatic hydrocarbon groups containing up to 6 carbon atoms which may be substituted;

$R^2$ is a saturated or unsaturated aliphatic hydrocarbon group containing up to 6 carbon atoms or aryl;

$R^3$ is a hydrogen atom, saturated or unsaturated aliphatic hydrocarbon group containing up to 3 carbon atoms or aryl;

$R^5$ is selected from the group consisting of a short chain alkyl group and a phenyl group which may be substituted with an alkyl, alkoxy or halogen group;

$R^7$ is a hydrogen atom or a —$OR^9$, —$NR^{10}R^{11}$ or —$SR^9$ groups;

$R^8$ is a hydrogen atom or a —$OR^9$ or —$SR^9$ group;

$R^9$, $R^{10}$ and $R^{11}$ have the same meaning as $R^3$;

Z represents the atoms for completing a condensed benzene ring which may be substituted with alkyl or alkoxy groups which contain up to 3 carbon atoms or with halogen;

Y is an oxygen or sulphur atom;

$n$ is 1 or 2;

$m$ is 0 or 1;

$q$ is 1 or 2;

Anion$^\ominus$ is any anion but is absent in cases where $R^1$, $R^4$ or $R^6$ contains an oxygen group in the anionic form so that a betaine is present;

Q is a radical required to complete a heterocyclic group containing a 5-membered or 6-membered heterocyclic ring such as commonly used in cyanine chemistry.

2. An electrophotographic recording material according to claim 1, characterised in that it contains, as photoconductor, zinc oxide embedded in a binder.

References Cited

UNITED STATES PATENTS

| | | | |
|---|---|---|---|
| 3,565,615 | 2/1971 | Brooker et al. | 96—1.6 |
| 3,565,616 | 7/1971 | Webster et al. | 96—1.6 |
| 3,600,165 | 8/1971 | Williams et al. | 96—1.7 |

ROLAND E. MARTIN, JR., Primary Examiner

U.S. Cl. X.R.

96—1.5, 1.6; 260—240 R, 240.5, 240.7, 240.9

UNITED STATES PATENT OFFICE
CERTIFICATE OF CORRECTION

Patent No. 3,782,933　　　　　　　　　Dated January 1, 1974

Inventor(s) Hans Ohlschlager et al

It is certified that error appears in the above-identified patent and that said Letters Patent are hereby corrected as shown below:

Column 21, line 8, cancel "oxygen" and insert --acid--.

Signed and Sealed this twenty-third Day of March 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,782,933            Dated January 1, 1974

Inventor(s) Hans Ohlschlager et al.

It is certified that error appears in the above-identified patent and that said Letters Patent are hereby corrected as shown below:

Column 1, formula of line 64 should read as follows:

Column 20, formula of line 40 should read as follows:

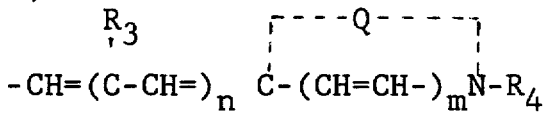

Signed and Sealed this second Day of August 1977

[SEAL]

Attest:

RUTH C. MASON
*Attesting Officer*

C. MARSHALL DANN
*Commissioner of Patents and Trademarks*